United States Patent
Lee et al.

(10) Patent No.: US 6,687,237 B1
(45) Date of Patent: Feb. 3, 2004

(54) METHODS AND SYSTEMS FOR FACILITATING A MULTI-MODE MULTI-PILOT HARD HANDOFF

(75) Inventors: Henry Lee, Gloucester (CA); William E. Illidge, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/283,151

(22) Filed: Apr. 1, 1999

(51) Int. Cl.$^7$ ................................................ H04Q 7/00
(52) U.S. Cl. .................... 370/331; 370/332; 370/333; 370/334; 370/335; 370/336; 370/337; 455/436; 455/552; 455/553
(58) Field of Search ................................ 370/331, 332, 370/333, 334, 335, 336, 337; 455/436–442, 552, 553

(56) References Cited

U.S. PATENT DOCUMENTS

| | | | | |
|---|---|---|---|---|
| 5,845,211 A | * | 12/1998 | Roach, Jr. ................... | 455/439 |
| 5,854,981 A | * | 12/1998 | Wallstedt et al. ........... | 455/439 |
| 5,911,122 A | * | 6/1999 | Corriveau et al. .......... | 455/436 |
| 5,974,319 A | * | 10/1999 | Kotzin et al. ............... | 455/436 |
| 6,044,271 A | * | 3/2000 | Findikli ...................... | 370/331 |
| 6,201,968 B1 | * | 3/2001 | Ostroff et al. .............. | 455/436 |
| 6,230,005 B1 | * | 5/2001 | Le et al. ..................... | 455/436 |
| 6,246,876 B1 | * | 6/2001 | Hontzeas .................... | 455/439 |
| 6,304,755 B1 | * | 10/2001 | Tiedemann, Jr. et al. ... | 455/438 |

FOREIGN PATENT DOCUMENTS

| | | |
|---|---|---|
| EP | 0888026 | 12/1998 |
| WO | WO9803031 | 1/1998 |
| WO | WO9806226 | 2/1998 |

OTHER PUBLICATIONS

"CDMA Intersystem Operations", Holcman et al, Qualcomm Incorporated, San Diego, California, U.S.A., XP 000495745, 1994 IEEE, pp. 590–594.

* cited by examiner

Primary Examiner—Sinh Tran
Assistant Examiner—Huy Nguyen

(57) ABSTRACT

A method and system to facilitate an inter-system CDMA multi-mode multi-pilot hard handoff is provided. Reference target cell information consisting of reference target cell designations and their attributes are passed between the BS and MSC interfaces and between the serving MSC and target MSC interfaces. This invention enhances the ANSI-41 and CDG IOS A-Interface specifications to include reference target cell information. The target MSC processes the handoff request using the reference target cell information. The target MSC uses the reference target cell information to perform the handoff and other functions such as handoff retries, load balancing, and target screening. This increases the reliability of inter-system CDMA multi-mode multi-pilot hard handoffs.

19 Claims, 2 Drawing Sheets

METHODS AND SYSTEMS FOR FACILITATING A MULTI-MODE MULTI-PILOT HARD HANDOFF

FIELD OF THE INVENTION

The invention relates to methods and systems for facilitating a multi-mode multi-pilot hard handoff within a wireless communications system.

BACKGROUND OF THE INVENTION

Where previously all CDMA mobile stations were single CDMA band class, for example 1900 MHz CDMA, multi-mode CDMA mobile stations are now becoming common. For example, mobile stations are now available with both 800 MHz AMPS and 800 MHz CDMA, and with both 800 MHz AMPS and 1900 MHz CDMA. There are also mobile stations with all three modes mentioned above, namely 800 MHz CDMA, 1900 MHz C and 800 MHz AMPS. Mobile stations which handle other modes/band classes and combinations of modes/band classes may also exist and almost certainly will continue to be developed.

Of course, such mobile stations are frequently involved in handoffs within a given mode, but they are also involved in handoffs between modes. Multi-Mode hard handoffs provide the capability of performing a hard handoff from a cell having one mode to a cell having another mode.

For example, depending upon the capability of a given mobile station, it may be necessary to perform a hard handoff:

from a 1900 MHz CDMA system to an 800 MHz CDMA system;

from an 800 MHz CDMA system to a 1900 MHz CDMA system;

from an 800 MHz CDMA system to an 800 MHz AMPS system; or from a 1900 MHz CDMA system to an 800 MHz AMPS system.

Multi-mode hard handoff functionality is needed, for example, for tri-mode networks, i.e., 800 MHz AMPS networks with both 1900 MHz CDMA and 800 MHz CDMA overlays. Knowing the capability of the phone becomes important since there will be a mix of mobile types (single, dual, tri-mode) in the network. Blindly handing a phone to a particular target system without taking the capability of the phone into account causes an unnecessary amount of dropped or degraded quality of calls in situations where a call could be maintained on a different system. For example, blindly handing all phones currently using 1900 MHz CDMA to 800 MHz CDMA, where 1900 MHz CDMA runs out of coverage, will cause dual-mode 1900 MHz CDMA/800 MHz AMPS phones to drop calls where cells may have been sustained by 800 MHz AMPS instead. Similarly, blindly handing all phones currently using 1900 MHz CDMA to 800 MHz AMPS, where 1900 MHz CDMA runs out of coverage, will cause tri-mode 1900 MHz CDMA/800 MHz CDMA/800 MHz AMPS phone to experience degraded quality where the quality of the call may have been sustained by handing off to 800 MHz CDMA instead. In a tri-mode network where subscribers have single-mode, dual-mode, or tri-mode phones, the client does not want calls to be necessarily dropped or handed down to AMPS when calls could otherwise be maintained on another CDMA system.

With existing multi-mode handoff techniques, when a source base station (or base stations if the mobile station is currently in soft handoff) and mobile station agree a handoff is necessary, a hard handoff to one or more new cells is attempted. This may involve various messages being passed to a first mobile switching centre, and possibly further on to a second mobile switching centre servicing a different set of basestations than that of the first mobile switching centre, and ultimately to one or more target base stations serving the new cells. In the event that no successful allocation of target resources results from this attempt, this fact is propagated all the way from the target base station back to the source base station which then may instigate an attempt to handoff to one or more different cells. This is notwithstanding the fact that a subsequent attempt may be routed through again to the second mobile switching centre, and possibly even to the same target base station.

Unfortunately, the time taken to propagate through from the source base station to the target base station and back on each attempt can be quite lengthy with the result that calls may be frequently dropped.

SUMMARY OF THE INVENTION

It is an object of the invention to obviate or mitigate one or more of the above identified disadvantages.

According to an embodiment of the invention, a method is provided for a handoff intermediary to participate in handing off a mobile station. The handoff intermediary generates a first group of cell identifiers of potential cells for handoff in the event that the handoff intermediary is a source base station. In the event that it is some other handoff intermediary which is source-to-target of the source basestation, it would receive a group of cell identifiers. The handoff intermediary sends a handoff intermediary in the source-to-target direction a second group of cell identifiers, the second group being a subset of the first group which identifies all cells in the group serviced through the handoff intermediary in the source-to-target direction. In so doing, the source-to-target handoff intermediary is provided with information with which it can participate in multiple attempts at handing off the mobile station to cells identified in the second group of cell identifiers without sending a handoff failure back to the previous handoff intermediary after each failed attempt. Preferably, the first group of cell identifiers includes cell identifiers for cells collectively providing at least two different capabilities. The group may include one or more cell attributes for each cell identifier, the cell attributes of a given cell identifier comprising at least a cell capability identifier. The group includes one or more reference target cells for each mode/capability represented in the group and may include additional target cells for each reference target cell. More specifically, there may be one reference target cell for each frequency/carrier for a given mode. Each lone reference target cell, and each reference target cell together with its associated additional target cells is a potential reference target cell or group of target cells for hard handoff. If a given reference target cell has associated target cells then the mobile station would be in soft handoff after completion of the hard handoff. Advantageously, source-to-target handoff intermediaries do not need to generate failure messages to handoff intermediaries in the target-to-source direction until they have exhausted their options for handoff.

This invention facilitates inter-system multi-mode multi-pilot hard handoffs by passing for each mode or capability of the mobile station, reference target cell information and additional target cell information from the serving system to the target system. In a particular example, this is passed in various forms from a source base station to a serving mobile switching centre, from the serving mobile switching centre to a target mobile switching centre, and from the target mobile switching centre to a target base station. This target cell information is used by the target system to perform the handoff and may also be used for other functions such as handoff attempts, load balancing, and target screening by taking into account the mobile station's capability.

Reference target cell information consists of a reference target cell designation and reference target cell attributes including at least an identification of the made of the target cell.

When multiple systems are involved in the handoff of a mobile station, target cell information is passed from the serving system to the target system relating to all capabilities which are both provided by the target system and handled by the mobile station. Preferably, this invention enhances the ANSI-41 add CDG IOS A-Interface specifications to include reference target cell information and their attributes.

Advantageously, the invention increases the reliability of inter-system CDMA multi-mode multi-pilot hard handoffs by expediting handoff attempts and handoff retries at the target system.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
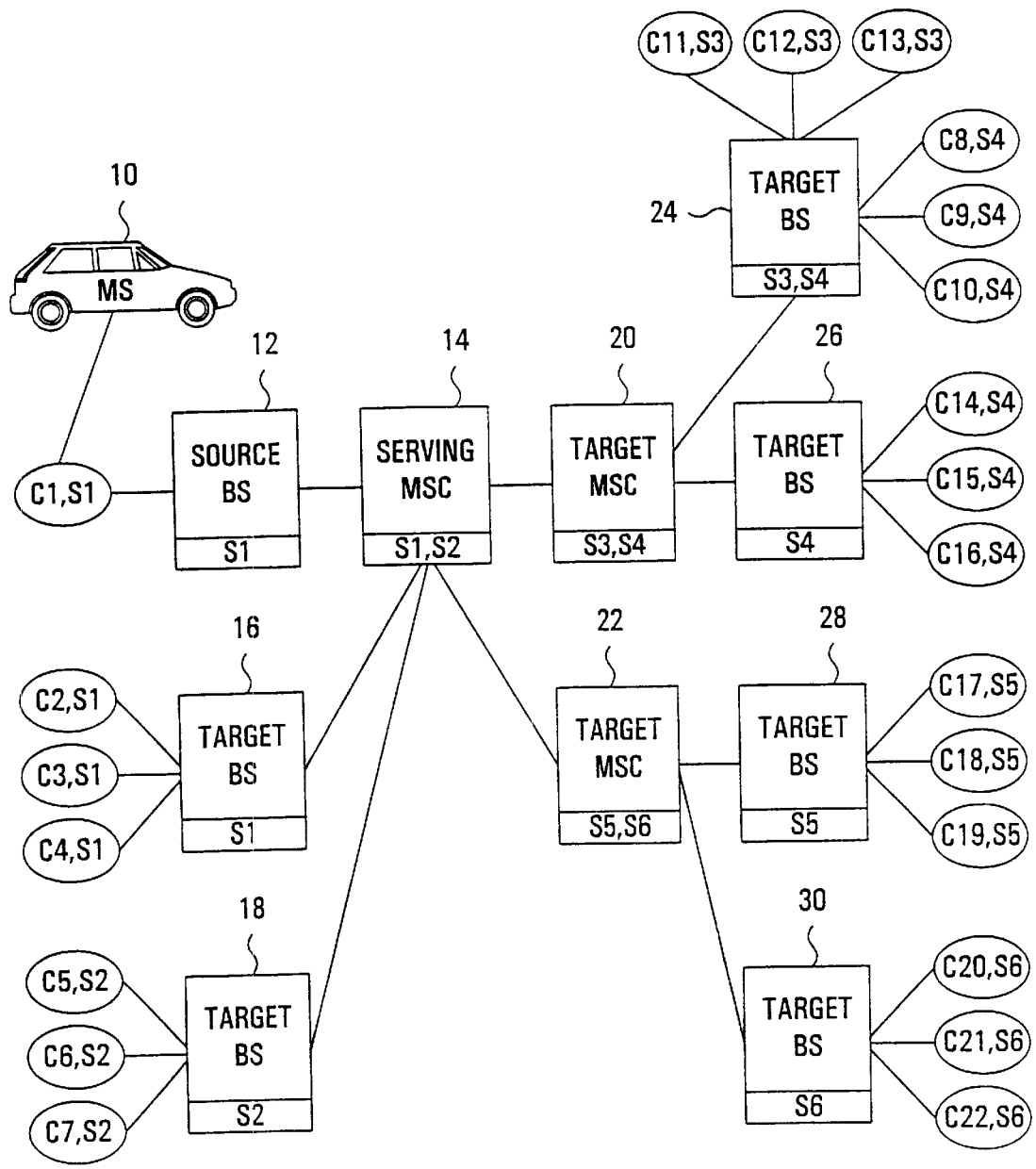
FIG. 1 is a block diagram of an example mobile communications network.

A detailed example of embodiment of the invention will be described with reference to an example network of FIG. 1. In this example, there is a MS (mobile station) 10 in a cell C1 being served by a source BS (base station) 12. The source BS 12 is served by a serving MSC (mobile switching center) 14 which also serves other BSs 16,18 (two shown) having their respective cells C2,C3,C4 and C5,C6,C7. Also shown are two target MSCs 20,22. The first target MSC 20 serves two target BSs 24,26 having respective cells C8,C9,C10, C11,C12,C13, and C14,C15,C16 and the second target MSC 22 serves two target BSs 28,30 having respective cells C17,C18,C19 and C20,C21,C22.

In the illustrated example, the MS 10 is communicating with a single source BS 12. More generally, it is noted that a mobile station may or may not be in soft handoff when it is determined that hard handoff is necessary. In the event that it is in soft handoff, the cells involved in the soft handoff are "serving cells" and one of these is designated as the "reference cell", typically the strongest serving cell. In the event it is not in soft handoff, the single serving cell is the reference cell.

Various capabilities are referred to as S1,S2,S3,S4 and S5. For the purpose of this example, it is assumed the mobile station has capabilities S1,S3,S4 and S5 and does not have capability S2. Each capability defines a particular mode for example. The modes which currently exist include the above identified 800 MHz CDMA, 1900 MHz CDMA, and 800 MHz AMPS. Each mode may have multiple frequencies/carriers.

For the purpose of this description, a path in the direction from the source BS 12 to a target BS will be referred to as a "source-to-target" path, and a path in the reverse direction will be referred to as a "target-to-source" path. Each device in the network which may be involved in handing off the MS will by referred to as a "handoff intermediary". Handoff intermediaries will be either target-to-source or source-to-target from a given handoff intermediary if they lie on a target-to-source path or a source-to-target path respectively. Using this terminology in the illustrated example, the serving MSC 14 is the only handoff intermediary directly source-to-target of the source BS. The two target MSCs 20,22 and their BSs 24, 26, 28, 30, and the target BSs 16,18 directly served by the serving MSC 14 are all source-to-target of the source MSC.

It is assumed that the serving MSC handles two capabilities referred to as S1 and S2, that target MSC 20 handles capabilities S3,S4, and that target MSC handles capabilities S5,S6, Furthermore, it is assumed each cell has an attribute consisting of a single associated capability. Each cell may also have other cell attributes, for example a particular frequency or carrier. The cell attributes for the purpose of this example are; C1,C2,C3,C4 have capability S1, C5,C6, C7 have capability S2, C8,C9,C10 have capability S4 at frequency F1, C11,C12,C13 and C14,C15,C16 have capability S4 at frequency F2, C17,C18,C19 have capability S5 and C20,C21,C22 have capability S6.

For the purpose of this example, the notation S1:(C1-R, C2,C3) will be used to designate a group of target cells relating to servile S1 consisting of C1 as the reference target cell and C2 and C3 as cells associated with the reference target cell C1.

A sample handoff performed according to the invention will be described with reference to FIG. 2 for the example network of FIG. 1. It is assumed that a determination has been made that some sort of handoff is necessary. Any conventional technique for making this determination may be used. For each capability, or alternatively only for each of the MSs capabilities, the source BS identifies one or more potential handoff cells for that capability including one or more reference target cells and possibly including additional target cells for one or more of the reference target cells. Determining potential target cells and the reference target cells may be done using any of the techniques conventionally used to identify cells for handoff within a single capability. If there are no potential cells for a particular capability then no cells for that capability are included. Preferably, the source BS knows the capabilities of the MS and uses this information to generate a group of cells only containing cells for these capabilities, or to filter a larger group to become a group only containing cells for these capabilities. Alternatively, this filtering step can be performed at any system node which has or can obtain a list of the mobile's capabilities, for example the serving MSC 14. The mobile's capabilities can be obtained by querying the mobile station during registration for example. How the mobile station's capabilities is obtained is not important, but rather what is important is that the source BS or serving MSC, for example, have this information or can obtain this information.

The source BS 12 then sends one or more messages to the serving MSC 14 indicating a handoff is required, and containing the group of cell identifiers. The information may be formatted in whatever way is convenient. For example, all the reference target cells may be identified in one message, with the remaining cells identified in another message. The messages must allow an identification of the capability each cell in for, and preferably allow an identification of whether a cell is a reference target cell or not.

Figure 2:
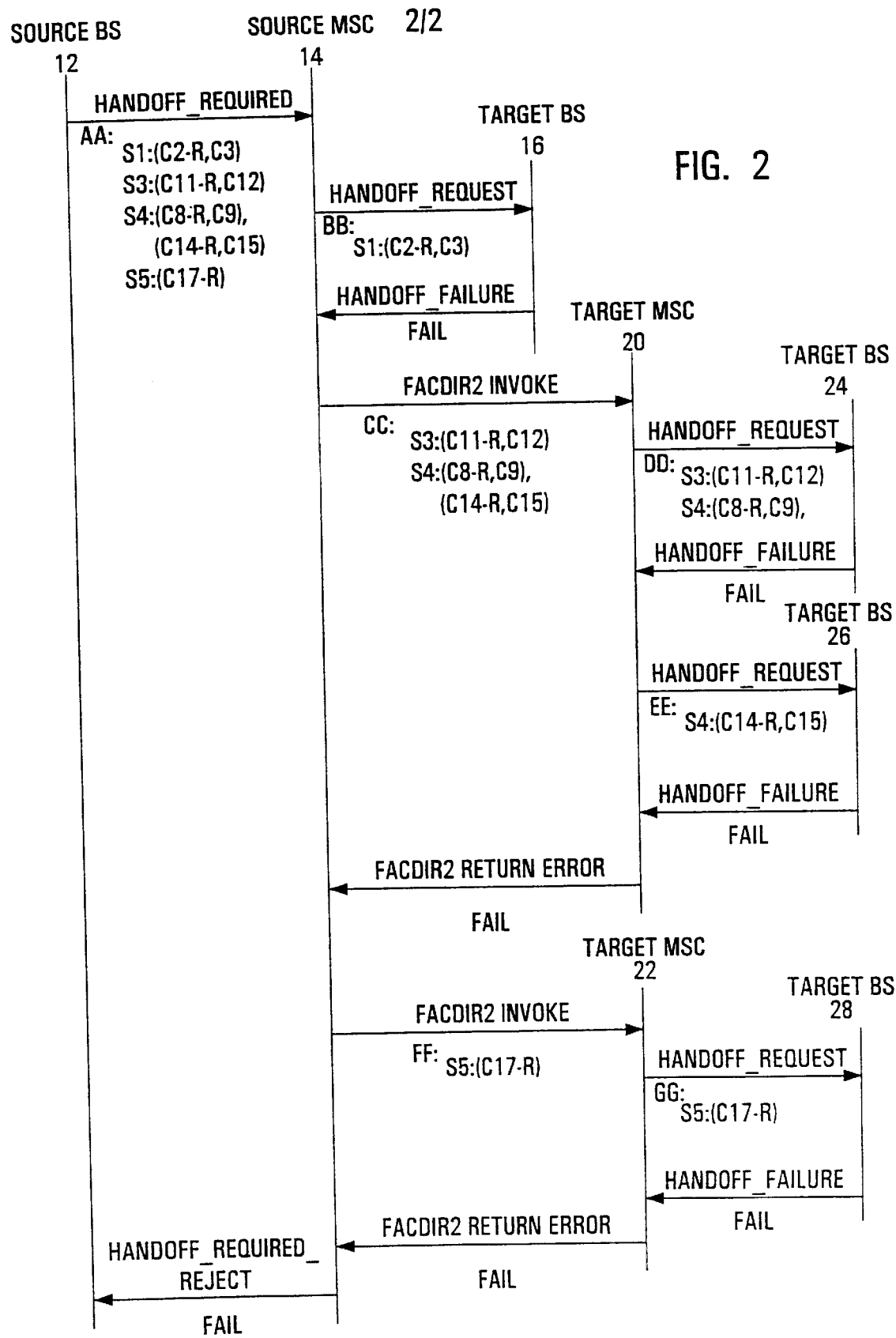
FIG. 2 is an example of a handoff message flow according to an embodiment of the invention.

This information is packaged and sent to the serving MS in one or more messages collectively identified as AA in FIG. 2. For example, these message(s) might include S1:(C2-R,C3) identifying cell C2 as the reference target cell for capability S1 and C3 as an additional cell for capability S1; S3:(C11-R,C12) identifying cell C11 as the reference target cell for capability S3 with C12 as an additional cell; S4;(C8-R,C9),(C14-R,C15) identifying cells C8 and C14 as reference target cells for S4 with additional cells C9 and C15 respectively; S5:(C17-R) identifying and C17 as the reference target cell for capability 5S with no additional cells. In this case, the mobile station does not have capability S2, so no cells for this capability are included in the message(s) sent to the serving MSC 14. Preferably, AA consists of a single message.

Preferably, the MSC upon receipt of such a message attempts the handoff within the same capability first. In this example, it would attempt to setup resources for a handoff within capability S1 to target cells C2 and C3 with C2 as the reference target cell. A message BB is sent to the target BS 16 containing S1:(C2-R,C3), and also an identification of any other reference target cells/target cells which are in a source-to-target direction of the target BS 16. In this case, there are no other such reference target cells/target cells. The BS 16 would attempt handoff with (C2-R,C3), and if that failed it would send a failure message back to the serving MSC 14.

The serving MSC 14 would then send a message CC to one of the target MSCs, for example the first target MSC 20. This would include all the cells in the original message(s) received from the source BS 12 which are source-to-target of the target MSC. This includes S3:(C11-R,C12) and S4:(C8-R,C9),(C14-R,C15).

The target MSC 10 then sends a message DD to one of the target BSs, for example BS 24. This would include all the cells in the original message(s) received from the source BS 12 which are source-to-target of the target BS 24. This includes S3:(C11-R,C12) and S4.(C8-R,C9). The target BS 24 would then first attempt to setup resources for a handoff to cells (C11-R,C12) with capability S3, and if this fails would attempt to setup resources for a handoff to cells (C8-R,C9) with capability S4. If both of these attempts fail, a failure is sent back to the target MSC 20. The target MSC then sends a message EE to the other target BS 26. This would include all the cells in the original messages received from the source BS 12 which are source-to-target of the target BS 26. This message contains S4:(C14-R,C15). The target BS 26 would attempt to setup resources for a handoff to cells (C14-R,C15). If this fails, a failure would be sent back to the target MSC 20 which, having no further options, would send a failure back to the serving MSC 14. The serving MSC 14 may then send a message FF to the other target MSC 22 containing all cells in the original list which are source-to-target of the target MSC 22. This includes C17 as the reference target cell for capability S5 with no additional cells. The target MSC 22 sends a message GG to target BS 28 containing this same information. In the event that no allocation of target resources for handoff is successfully made, a failure is sent back to the target MSC 22 and to the serving MSC 14. The serving MSC 14 having no further options at this time finally sends a failure back to the source BS 12.

At any point ii the above scenario after a successful allocation of resources, for example after sending any one of messages BB,DD,EE or GG further messaging would typically follow which enables the completion of the handoff. For example, if resources were successfully allocated after message DD, the remainder of the messages in FIG. 2 following message DD would not occur, but rather any further messaging necessary to complete the handoff would follow.

The example of FIG. 2 is more complicated than would typically occur for the purpose of a comprehensive illustration. Handoffs could be attempted using different resources until all the possible resources are exhausted, or until some other predetermined condition(s) exist. These condition(s) could include a maximum number of attempts, or a maximum time for example.

For the purpose of clarification, the additional messaging which would be required in conventional systems for the above example will be described briefly. For the first handoff request (BB), the following messages would be required:
 source BS 12 to serving MSC 14;
 serving MSC 14 to target BS 16;
 target BS 16 to serving MSC 14;
 serving MSC 14 to source BS 12.
For the second handoff request DD, the following messages would be required in relation to the handoff attempt for service S3:
 source BS 12 to serving MSC 14;
 serving MSC 14 to target MSC 20;
 target MSC 20 to target BS 24;
 target BS 24 to target MSC 20;
 target MSC 20 to serving MSC 14;
 serving MSC 14 to source BS 12.
For the second handoff request DD, the following messages would be required in relation to the handoff attempt for service S4:
 source BS 12 to serving MSC 14;
 serving MSC 14 to target MSC 20;
 target MSC 20 to target BS 24;
 target BS 24 to target MSC 20;
 target MSC 20 to serving MSC 14;
 serving MSC 20 to source BS 12.
For the third handoff request EE, the following messages would be required:
 source BS 12 to serving MSC 14;
 serving MSC 24 to target MSC 20;
 target MSC 20 to target BS 26;
 target BS 26 to target MSC 20;
 target MSC 20 to serving MSC 14;
 serving MSC 24 to source BS 12.
For the fourth handoff request GG, the following messages would be required:
 source BS 12 to serving MSC 14;
 serving MSC 14 to target MSC 22;
 target MSC 22 to target BS 28;
 target BS 28 to target MSC 22;
 target MSC 22 to serving MSC 14;
 serving MSC 14 to source BS 12.
The total number of messages in conventional systems is 28, where in the example provided for the invention, only 14 messages are required resulting in a substantial decrease in messaging overhead and delay.

By including reference target cells associated with particular capabilities in messages sent in connection with handoff, the functions of handoff retries, load balancing, and target screening can be pushed away from the source BS 12. This reduces dramatically the messaging which is sent all the way back to the source BS 12 in connection with handoff failures and results in handoffs being performed more quickly in the event that one or more failures do occur.

Interface Modifications

The above description has been relatively independent of the various existing standards which have been S defined for CDMA systems. The current standard for messaging between a BS to a MSC in CDMA systems is the CDG IOS A-Interface, and the standard for messaging from one MSC to another is the ANSI-41 MSC to MSC interface. Preferably, the handoff message flow description is similar to that described in the ANSI-41 specification and CDG IOS A-Interface specification. The differences are detailed below. For the purpose of explaining this, each message in FIG. 2 has a standardized message name above its corresponding arrow. The initial message from the source BS 12 to the serving MSC 14 is a HANDOFF_REQUIRED message (A-interface); the message from the serving MSC 14 to the target MSC 20 is a "FACDIR2 Invoke" message (ANSI-41); the message from an MSC to a target BS requesting a handoff is a HANDOFF_REQUEST message (A-interface); the message from a target BS to an MSC following a failed attempt at handoff is a HANDOFF_FAILURE (A-interface); the message from a target MSC to a serving MSC following a failed attempt at handoff is a FACDIR2 Return Error (ANSI-41); the message from the serving MSC to the source BS following a failed attempt at handoff is HANDOFF_REQUIRED_REJECT (A-interface). The messages which follow a successful allocation of resources are not shown as this is standard. In the particular example of FIG. 2, a successful allocation of resources could occur following any of the HANDOFF_REQUEST messages, and this would result in conventional messaging being sent to complete tho handoff.

CDG IOS A-Interface

Since new information elements are required, interface changes are required in the HANDOFF_REQUIRED and HANDOFF_REQUEST messages. New parameters, CDG IOS A-Interface Reference Target Cell List and CDG IOS A-Interface Reference Target Cell Information are preferably defined as follows.

The CDG IOS A-Interface CDMA Reference Target Cell List parameter consists of one or more instances of the CDG IOS A-Interface Reference Target Cell Information parameter. The CDG IOS A-Interface CDMA Reference Target Cell Information parameter includes a Cell Identifier parameter, a Band Class, and a CDMA field (1 bit) which indicates if the cell is CDMA air interface technology or AMPS for example.

TABLE 1

New CDG IOS A-Interface CDMA Reference Target Cell List Parameter

| 7 | 6 | 5 | 4 | 3 | 2 | 1 | 0 | Octet |
|---|---|---|---|---|---|---|---|---|
| Identifier | | | | | | | | 1 |
| Length | | | | | | | | 2 |
| Number of reference target cells | | | | | | | | 3 |
| Reference Target Cell Information 1 | | | | | | | | 4 |
| ... | | | | | | | | |
| Reference Target Cell Information n | | | | | | | | variable |

TABLE 2

New CDG IOS A-Interface CDMA Reference Target Cell Information Parameter

| 7 | 6 | 5 | 4 | 3 | 2 | 1 | 0 | Octet |
|---|---|---|---|---|---|---|---|---|
| Identifier | | | | | | | | 1 |
| Length | | | | | | | | 2 |
| Cell Identifier | | | | | | | | |
| | | | | | CDMA | Band Class | | variable |

The other cells which are not reference target cells are preferably identified in an existing parameter entitled "Cell Identifier List(Target)" which is modified to include an identification of Band Class and air interface technology such as CDMA or AMPS for each cell. This is illustrated in Table 3 below.

TABLE 3

Changed CDG IOS A-Interface Cell Identifier List (Target)

| 7 | 6 | 5 | 4 | 3 | 2 | 1 | 0 | Octet |
|---|---|---|---|---|---|---|---|---|
| Identifier | | | | | | | | 1 |
| Length | | | | | | | | 2 |
| Cell Identification Discriminator | | | | | | | | 3 |
| Cell Identification 1 | | | | | | | | 4 |
| | | CDMA | | Band Class 1 | | | | |
| . | | | | | | | | |
| . | | | | | | | | |
| Cell Identification n | | | | | | | | |
| | | CDMA | | Band Class n | | | | Variable |

In the above table the Band Class field (preferably 5 bits) indicates the Band Class for example as specified in TSB-58. The CDMA field (1 bit) indicates if the cell is CDMA air interface technology For example 0 could indicate AMPS, and 1 could indicate CDMA. These two fields are added to the existing parameter definition of the Cell Identifier List.

Interface changes are required in the FACDIR2 Invoke message. New parameters, ANSI-41 CDMA Reference Target Cell List and ANSI-41 CDMA Reference Target Cell Information are preferably defined.

The ANSI-41 CDMA Reference Target Cell List parameter consists of one or more instances of the ANSI-41 CDMA Reference Target Cell Information parameter. The ANSI-41 CDMA Reference Target Cell Information parameter includes the IS-41C CDMA Band Class parameter and IS-41C Target parameter.

TABLE 4

New ANSI-41 CDMA Reference Target Cell List

Parameter

| Field | Value | Type | Reference | Notes |
|---|---|---|---|---|
| Identifier | CDMA Reference Target Cell List IMPLICIT SEQUENCE | M | 6.5.1.2 | |
| Length | variable | M | 6.5.1.1 | |
| Contents | | | | |
| CDMA Reference Target Cell Information | | M | | a |
| ... | | | | | a: Repeat as Required

TABLE 5

New ANSI-41 CDMA Reference Target Cell

Information Parameter

| Field | Value | Type | Reference | Notes |
|---|---|---|---|---|
| Identifier | CDMA Reference Target Cell Information IMPLICIT SEQUENCE | M | 6.5.1.2 | |
| Length | variable | M | 6.5.1.1 | |
| Contents | | | | |
| CDMA Pilot Strength | | M | 6.5.2.35 | |
| CDMA Target One Way Delay | | M | 6.5.2.46 | |
| Target Cell ID | | M | 6.5.2.148 | |
| CDMA Band Class | | M | 6.5.2.a | |
| ... | | | | a | a: Ignore unexpected parameters, if received.

The additional cells other than the reference target cells may not necessarily need to be transmitted over the ANSI-41 interface as the target MSC may already know this information. To keep the interfaces consistent, however, this could be added to the ANSI-41 interface by making modifications to the CDMAandClass Parameter and the CDMATargetMAHOInformation parameter. The CDMABandClass parameter may be amended to include the CDMA field identified above to distinguish between AMPS and CDMA as the air interface technology. The CDMATargetMAHOInformation parameter is then amended to include the CDMABandClass parameter.

The Changed CDMABandClass Parameter

| Field | Value | | | | | Type | Reference | |
|---|---|---|---|---|---|---|---|---|
| Identifier | CDMA BandClass IMPLICIT OCTET STRING | | | | | M | 6.5.1.2 | |
| Length | Variable Octets | | | | | M | 6.5.1.1 | |
| Contents | | | | | | | | |
| H | G | FIGURE | E | D | C | B | A | Octet |
| Reserved | | CDMA | BandClass | | | | | 1 |
| ... | | | | | | | | n |

In the above, the "Reserved" field was formerly three octets. One of these has been used for a CDMA field which is similar in function to that described in previous tables.

| Field | Value | Type | Reference |
|---|---|---|---|
| Identifier | CDMATargetMAHOInformation IMPLICIT SEQUENCE | M | 6.5.1.2 |
| Length | Variable | M | 6.5.1.1 |
| Contents | | | |
| Target Cell ID | | M | 6.5.2.148 |
| CDMAPilotStrength | | M | 6.5.2.35 |
| CDMATargetOneWayDelay | | M | 6.5.2.46 |
| CDMABandClass | | M | Prev. table |

In the ANSI-41 tables, the "reference" column refers to sections in the following specifications;

IS-41C "Cellular Radio telecommunications Intersystem Operations";

TIA/EIA/IS-735 "Enhancements to TIA/EIA-41-D & TIA/EIA-664 for Advanced Features in Wideband Spread Spectrum Systems; and TSB-76 "IS-41C Enhancements for PCS Multi-band Support.

The above modifications have been described for the FACDIR2 Invoke message. Similar modifications are preferably made for other existing ANSI-41 messages related to handoff including HOBACK2 Invoke and Handoff To Third2 Invoke.

The above modifications do not cover the case where multiple target cell groupings exist within one capability, for example at two different frequencies. Preferably, if this is a desired capability, the above referenced messages are further amended to include a further cell attribute for each cell identifying its frequency/carrier.

Numerous modifications and variations of the present invention are possible in light of the above teachings. It is therefore to be understood that within the scope of the appended claims, the invention may be practised otherwise than as specifically described herein.

In the above described example, it has been assumed that the source basestation generates the group identifying cells to which handoff may be attempted, filters this to include only cells relating to capabilities of the mobile station, and forwards this to the mobile switching centre. It has been indicated previously that the filtering function can be moved from the source basestation to any handoff intermediary which has the required information, for example the serving MSC. Similarly, the actual generation of the group of cells might be moved from the source basestation to the serving MSC in some circumstances. The serving MSC could do this by default, or it could receive one or more messages from the source BS, and then ignore these and construct its own groups of cell identifiers.

In the above examples, it has always been assumed that the messaging includes cell identifiers and also includes attributes identifying the capability and possibly a frequency or carrier for the cell, and this is the preferred approach. More generally, it may not be necessary to include this capability information or the frequency/carrier information, so long as whenever necessary, a given handoff intermediary is able to determine a cell's attributes and act accordingly. For example, if a target MSC knows the attributes of all the cells that it serves, then it is capable of determining groups of cells for handoff on the basis of this without this information being included in the messages received from the source MSC. In a further example, it a target BS receives target cell identifiers including two reference target cells and four additional cells, the target BS knows the capability of each of the reference target cells and each of the additional cells, and can group each reference target cell with its associated cells, and then can attempt to setup resources for a handoff to each group of cells.

We claim:

1. A method for a first handoff intermediary to participate in handing off a mobile station comprising the steps of:
   a) the first handoff intermediary receiving or generating a first group of cell identifiers of potential cells for handoff;
   b) the first handoff intermediary sending a second handoff intermediary a second group of cell identifiers, the second group being a subset of the first group which identifies all cells in the first group serviced through any handoff intermediary in a source-to-target direction from the first handoff intermediary;
   whereby the second handoff intermediary is provided with information with which it can participate in multiple attempts at handing off the mobile station to cells identified in the second group of cell identifiers without sending a handoff failure back to the first handoff intermediary after each failed attempt.

2. A method according to claim 1 wherein said first group of cell identifiers comprises cell identifiers for cells collectively providing at least two different capabilities.

3. A method according to claim 2 wherein the group includes an identification of one or more reference target cells for each capability represented in the group.

4. A method according to claim 3 wherein at least one reference target cell in the group has one or more associated target cells, and each reference target cell and associated target cells define a set of cells to which handoff can be attempted.

5. A method according to claim 1 wherein the group comprises one or more cell attributes for each cell identifier, the cell attributes of a given cell identifier comprising at least a cell capability.

6. A method according to claim 5 wherein the first handoff intermediary generates the first list of potential cells and in so doing includes in the list only cells having capabilities that match a capability of the mobile station.

7. A method according to claim 5 further comprising:
   determining one or more capabilities of the mobile station; and
   wherein each cell selected for the second list has a capability matching one of the mobile station's capabilities.

8. A method according to claim 1 wherein the group includes an identification of at least one reference target cell.

9. A method according to claim 1 wherein in the event a handoff failure is received from the second handoff intermediary, the first handoff intermediary performs step b) repeatedly for respective different handoff intermediaries until a successful allocation of resources or until other predetermined conditions exist.

10. A method for a basestation to participate in a handoff of a mobile station, comprising:
    identifying one or more cells which are appropriate for handoff of the mobile station for each of at least two different capabilities;
    outputting one or more messages collectively containing identifiers of each of said cells and said each cell's respective capability;
    wherein said one or more messages are sent to a mobile switching centre and comprise a Handoff_Request message generally in accordance with the CDG IOS A-interface standard except for modifications to allow the inclusion of the multiple cells of differing capability and said each cell's respective capability.

11. A method according to claim 10 wherein said one or messages are sent to a mobile switching centre and comprise a Handoff_Request message generally in accordance with the CDG IOS A-interface standard except for modifications to allow the inclusion of the reference target cell identifiers and their respective capabilities, and to allow inclusion of the associated additional cells and their capabilities.

12. A method for a basestation to participate in a handoff of a mobile station, comprising:
    identifying one or more cells which are appropriate for handoff of the mobile station for each of at least two different capabilities;
    outputting one or more messages collectively containing identifiers of each of said cells and said each cell's respective capability;
    wherein said step of identifying at least two cells for each of at least two capabilities comprises:
      identifying a reference target cell for each of at least two capabilities;
      for at least one reference target cell, identifying one or more associated additional cells, wherein each reference target cell and its associated additional cells form a set of cells to which hard handoff can be performed.

13. A method for a serving mobile switching centre to participate in a handoff comprising:
    receiving from a source basestation one or more messages collectively containing a group of cell identifiers;
    sending one or more messages to another mobile switching centre comprising cell identifiers of all cells in said group which are served by said another mobile switching center.

14. A method according to claim 13 wherein one or more messages has a respective capability for each cell in the group.

15. A method according to claim 14 wherein the group comprises a reference target cell for each capability and one or more additional cells for at least one reference target cell.

16. A method according to claim 15 wherein said one or more messages sent to said another mobile switching centre are generally in accordance with the ANSI-41 MSC-MSC standard, except for modifications to allow the inclusion of the reference target cell identifiers and their respective capabilities, and to allow inclusion of the associated additional cells and their capabilities.

17. A method according to claim 14 wherein said one or more messages are generally in accordance with the ANSI-41 MSC-MSC standard except for modifications to allow the inclusion of the each cell's respective capability.

18. A handoff intermediary adapted to participate in handing off a mobile station, comprising:

a) means for receiving or generating a first group of cell identifiers of potential cells for handoff;

b) means for sending a second handoff intermediary a second group of cell identifiers, the second group being a subset of the first group which identifies all cells in the first group serviced through any handoff intermediary in a source-to-target direction from the first handoff intermediary;

whereby the second handoff intermediary is provided with information with which it can participate in multiple attempts at handing off the mobile station to cells identified in the second group of cell identifiers without sending a handoff failure back to the first handoff intermediary after each failed attempt.

19. A mobile switching centre adapted to participate in a handoff, comprising:

means for receiving from a source basestation one or more messages collectively containing a group of cell identifiers;

means for sending one or more messages to another mobile switching centre comprising cell identifiers of all cells in said group which are served by said another mobile switching center.

* * * * *